United States Patent
Nania (10) Patent No.: US 6,843,523 B2
(45) Date of Patent: Jan. 18, 2005

(54) STOWAGE COVER FOR A CONVERTIBLE TOP

(75) Inventor: Adrian Nania, Rochester, MI (US)

(73) Assignee: Edscha Roof Systems Inc., Pontiac, MI (US)

( * ) Notice: Subject to any disclaimer, the term of this patent is extended or adjusted under 35 U.S.C. 154(b) by 0 days.

(21) Appl. No.: 10/663,326

(22) Filed: Sep. 16, 2003

(65) Prior Publication Data

US 2004/0056508 A1 Mar. 25, 2004

Related U.S. Application Data

(60) Provisional application No. 60/412,048, filed on Sep. 19, 2002.

(51) Int. Cl.$^7$ .................................................. B60J 7/00
(52) U.S. Cl. .............................. 296/136.05; 296/107.08
(58) Field of Search ....................... 296/107.08, 136.05, 296/136.03, 76

(56) References Cited

U.S. PATENT DOCUMENTS

| | | | | |
|---|---|---|---|---|
| 5,967,593 A | * | 10/1999 | Schuler et al. | 296/136.06 |
| 6,145,915 A | * | 11/2000 | Queveau et al. | 296/107.08 |
| 6,217,104 B1 | | 4/2001 | Neubrand | 296/108 |
| 6,254,165 B1 | | 7/2001 | Neubrand | 296/76 |
| 6,293,605 B2 | | 9/2001 | Neubrand | 296/76 |
| 6,315,349 B1 | | 11/2001 | Kinnanen | 296/108 |
| 6,361,097 B1 | | 3/2002 | Lechkun | 296/37.1 |
| 6,386,615 B2 | | 5/2002 | Neubrand et al. | 296/76 |
| 6,425,622 B2 | | 7/2002 | Eberle | 296/108 |
| 6,604,774 B2 | * | 8/2003 | Koch et al. | 296/107.08 |
| 6,616,213 B2 | * | 9/2003 | Koch | 296/107.08 |
| 6,663,163 B2 | * | 12/2003 | Koch | 296/107.08 |

* cited by examiner

Primary Examiner—Joseph D. Pape
(74) Attorney, Agent, or Firm—Davidson, Davidson & Kappel, LLC (57) ABSTRACT

A cover assembly for a vehicle having a convertible top stowage area and a trunk. The cover assembly includes a stowage cover and an intermediate panel disposed between the trunk and the convertible top stowage area. The assembly also includes a connecting apparatus attached to the stowage cover and the intermediate panel. The connecting apparatus is configured to guide the stowage cover between a covering position, in which the stowage cover is covering the convertible top stowage area, and a stored position, in which the stowage cover is located in the trunk. In addition, a method for covering a convertible top of a vehicle that includes a convertible top stowage area and a trunk. The method includes moving the convertible top of the vehicle from an up position to a down position, in which the convertible top is located in the convertible top stowage area, and guiding the stowage cover from a stored position, in which the stowage cover is located in the trunk, to a covering position, in which the stowage cover is covering the stowage area. The guiding of the stowage cover is performed using a connecting apparatus attached to the stowage cover and to an intermediate panel disposed between the trunk and the convertible top stowage area.

20 Claims, 8 Drawing Sheets

STOWAGE COVER FOR A CONVERTIBLE TOP

CROSS-REFERENCE TO RELATED APPLICATIONS

This application claims priority to U.S. provisional application Ser. No. 60/412,048, filed on Sep. 19, 2002.

FIELD OF THE INVENTION

The present invention relates generally to a cover assembly for a vehicle, and more particularly to a cover assembly having a stowage cover for covering a convertible top stowage area of a vehicle.

BACKGROUND OF THE INVENTION

Conventional convertible automobiles typically have retractable convertible roofs that retract into a convertible top stowage area, or tonneau, of the vehicle. It is desired to cover the convertible top stowage area of a vehicle with a cover, sometimes referred to as a tonneau cover, especially when the convertible top is in the open position. Such a cover protects the convertible top from damage due to exposure to the elements and improves the aerodynamics of the vehicle. A common way to cover the convertible top stowage area of a vehicle is with the use soft cover that is manually affixed to the vehicle. Other ways to cover the convertible top stowage area are also known.

U.S. Pat. No. 6,386,615 B2, which is not necessarily prior art to the present invention, describes a retractable tonneau cover mounted to a decklid of the vehicle trunk. The decklid partially defines an opening through which the convertible top may retract into a tonneau, or storage well. In the system described in the '615 patent, the storage well is located in the trunk itself. The tonneau cover can be slid on tracks from a stored position underneath the decklid, a position adjacent the opening in the decklid, thus covering the opening.

SUMMARY OF THE INVENTION

The present invention provides a cover assembly for a vehicle having a convertible top stowage area and a trunk. The cover assembly includes an intermediate panel disposed between the trunk and the convertible top stowage area, a stowage cover, and a connecting apparatus attached to the stowage cover and to the intermediate panel. The connecting apparatus is configured to guide the stowage cover between a covering position, in which the stowage cover is covering the convertible top stowage area, and a stored position, in which the stowage cover is located in the trunk.

The cover assembly may also include an actuation device configured to move the stowage cover between the covering position and the stored position. The actuation device may include at least one of a motor, a hydraulic actuator, and a pneumatic actuator.

The stowage cover may include several members which may be pivotally attached to one another. The members of the stowage cover may be substantially coplanar in the covering position and folded in the stored position. A folding actuator may be configured to fold the members when the stowage cover is moved from the covering position to the stored position and unfold the members when the stowage cover is moved from a stored position to a covering position. The connecting apparatus may include at least one goose neck hinge.

The present invention may also include a trunk lid moveable from a closed to an opened position in a rearward direction. In addition, a first latching mechanism may be included for releasably latching the trunk lid to the intermediate panel and a second latching mechanism for releasably latching the intermediate panel to the vehicle. One of the first and second latching mechanisms may be configured to unlatch for moving the trunk lid to the open position. When moving the stowage cover between the covering position and the stored position, the second latching mechanism may be configured to unlatch the intermediate panel from the vehicle so as to enable the intermediate panel to move with the trunk lid to the opened position. A trunk lid actuation device may be included for moving the trunk lid from the closed position to the opened position. In addition, a controller may be included for controlling the trunk lid actuation device and the first and second latching mechanisms during a movement of the stowage cover between the covering position and the stored position.

A third latching mechanism may be used for latching the stowage cover to the trunk lid when the stowage cover is in the stored position. The cover assembly according to the present invention may also include a convertible top moveable between an up position and a down position, wherein the convertible top is located in the convertible top stowage area in the down position. A vehicle hard top may also be included, which is mounted to the vehicle when the stowage cover is in the covering position.

The present invention also provides a method for covering a convertible top of a vehicle that has a convertible top stowage area and a trunk. The method includes moving the convertible top of the vehicle from an up position to a down position, wherein, in the down position the convertible top is located in the convertible top stowage area of the vehicle. The method also includes and guiding the stowage cover from a stored position, in which the stowage cover is located in the trunk, to a covering position, in which the stowage cover is covering the stowage area. The guiding is performed using a connection apparatus that is connected to the stowage cover and to an intermediate panel disposed between the trunk and the convertible top stowage area.

The method may also include, before the guiding of the stowage cover, latching the intermediate panel to the trunk lid, unlatching the intermediate panel from the vehicle, and opening the trunk lid so that the intermediate panel moves away from the vehicle. The steps of the method may be performed automatically using at least one of a motor, a hydraulic device, and a pneumatic device.

Accordingly, the cover assembly according to the present invention, may be easily configured so as to be actuated by the flip of a switch. Thus, moving the stowage cover from the stored to the covering position and vice versa, can occur automatically, without leaving the vehicle. The covering of the convertible top stowage area according to the present invention can be performed more quickly and conveniently and with much less effort compared with manual stowage covers. In addition, the use of a rigid stowage cover instead of a soft one, the aerodynamics of the vehicle are improved. Furthermore, because the stowage cover may be folded and latched to the trunk lid, the available remaining space in the trunk is greatly improved. Moreover, because a hard top can be mounted to the vehicle with the stowage cover in the covering position, the stowage cover replaces the parcel tray that is typically attached to the hard top.

DESCRIPTION OF THE DRAWINGS

An embodiment of the present invention is elaborated upon below with reference to the accompanying drawings, in which.

DETAILED DESCRIPTION

Figure 1:
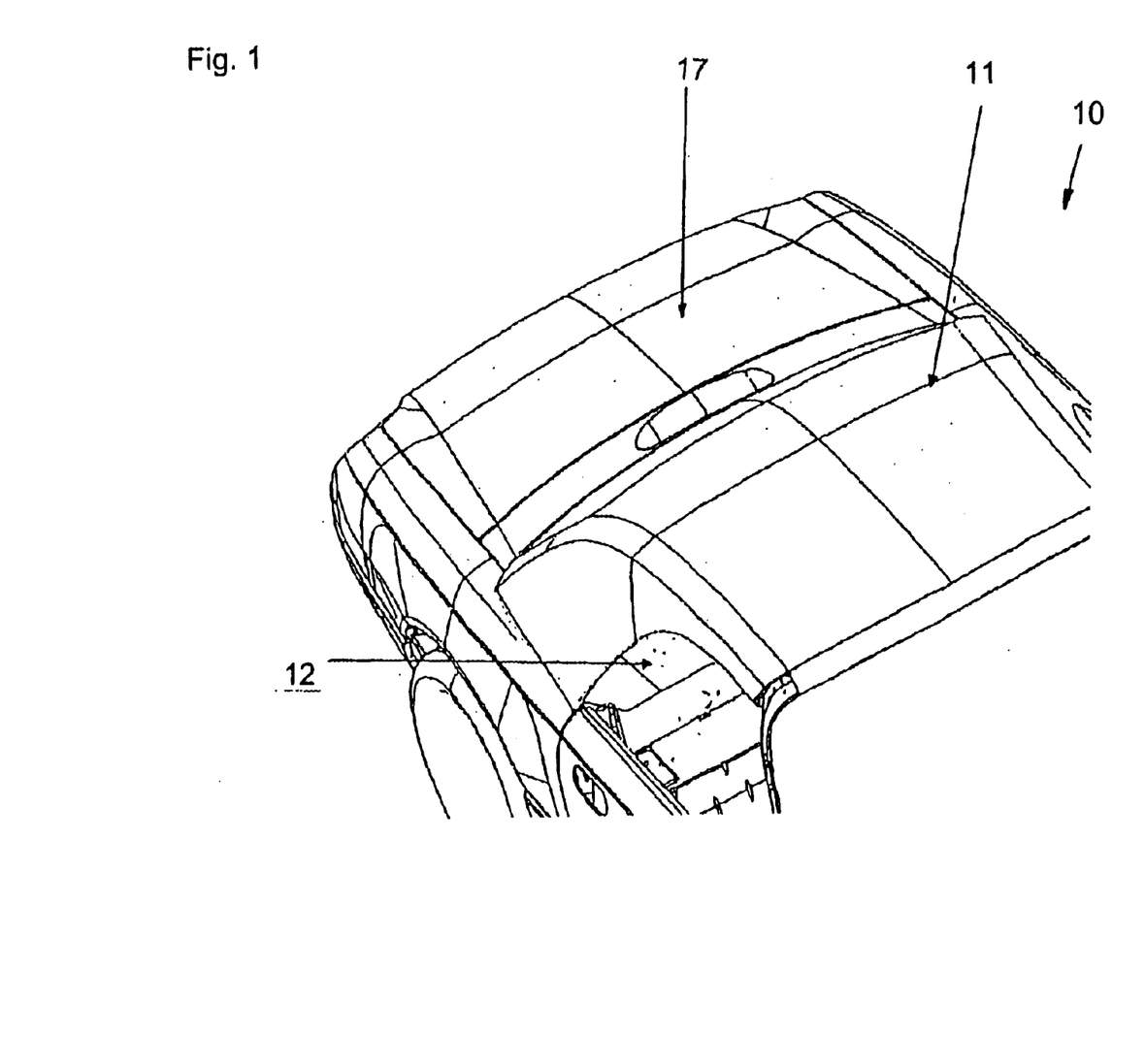
FIG. 1 shows the cover assembly according to the present invention in a convertible vehicle with a hard top installed.

In one embodiment of the present invention, vehicle 10 is shown in FIG. 1, which is a convertible vehicle. It has a retractable soft convertible top, as well as a removable hard top 11. The hard top 11, can be mounted to vehicle 10 during the winter months to provide added protection to the passengers from the outdoor elements. Stowage cover 12 is shown in its covering position, underneath the hard top 11, where the stowage cover acts as a parcel tray on the interior of the vehicle 10. The retractable convertible top is in the stowage area underneath the stowage cover 12.

Figure 2:
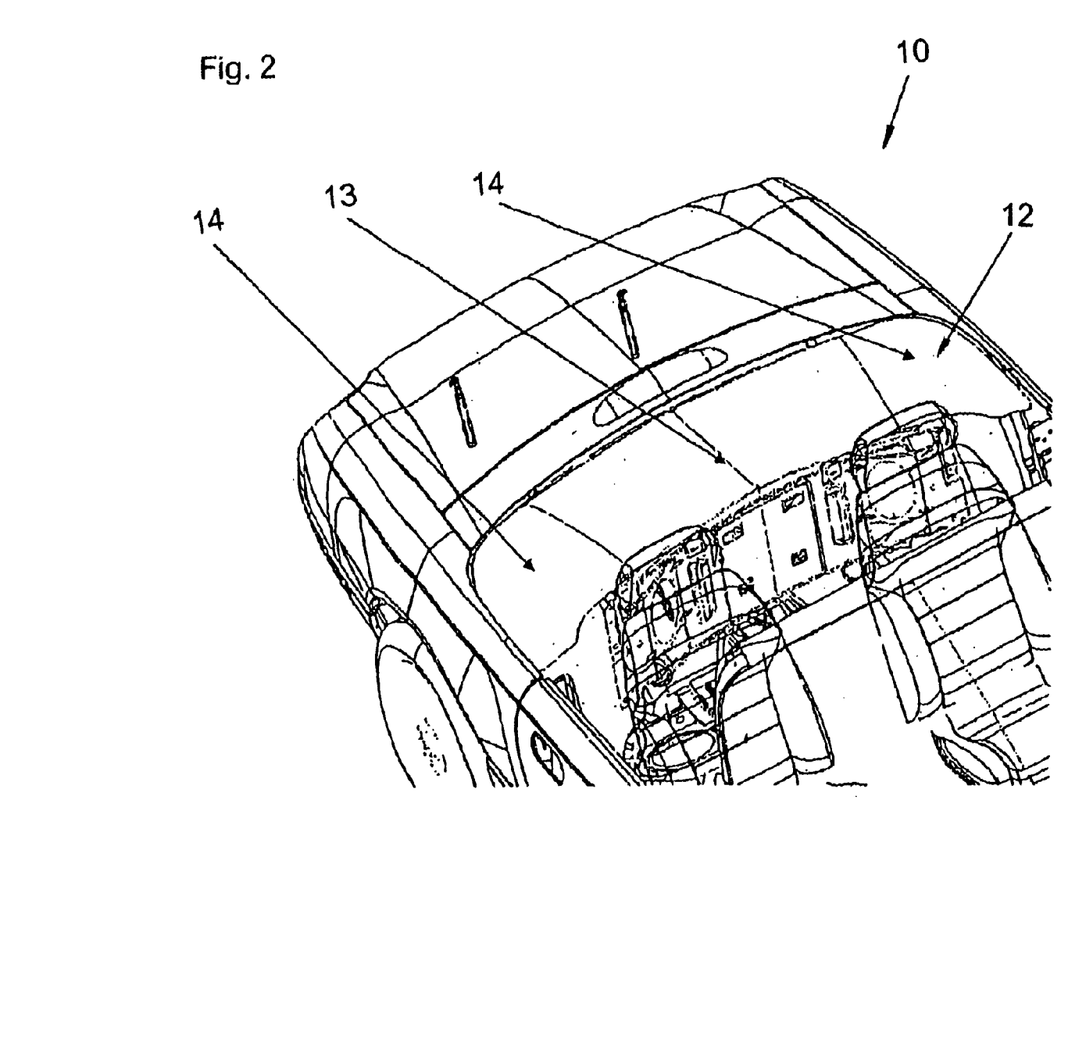
FIG. 2 shows the vehicle of FIG. 1 with the hard top removed.

FIG. 2 shows vehicle 10 with hard top 11 removed. The convertible top is in the stowage area underneath stowage cover 12. Stowage cover 12 includes three separate members, middle flap 13, and two side flaps 14. The side members 14 (or side flaps) are pivotally connected to the middle member (or middle flap) 13 by hinge connections. Stowage cover 12 is shown in its covering position, in which it covers the convertible top stowage area of vehicle 10.

Figure 3:
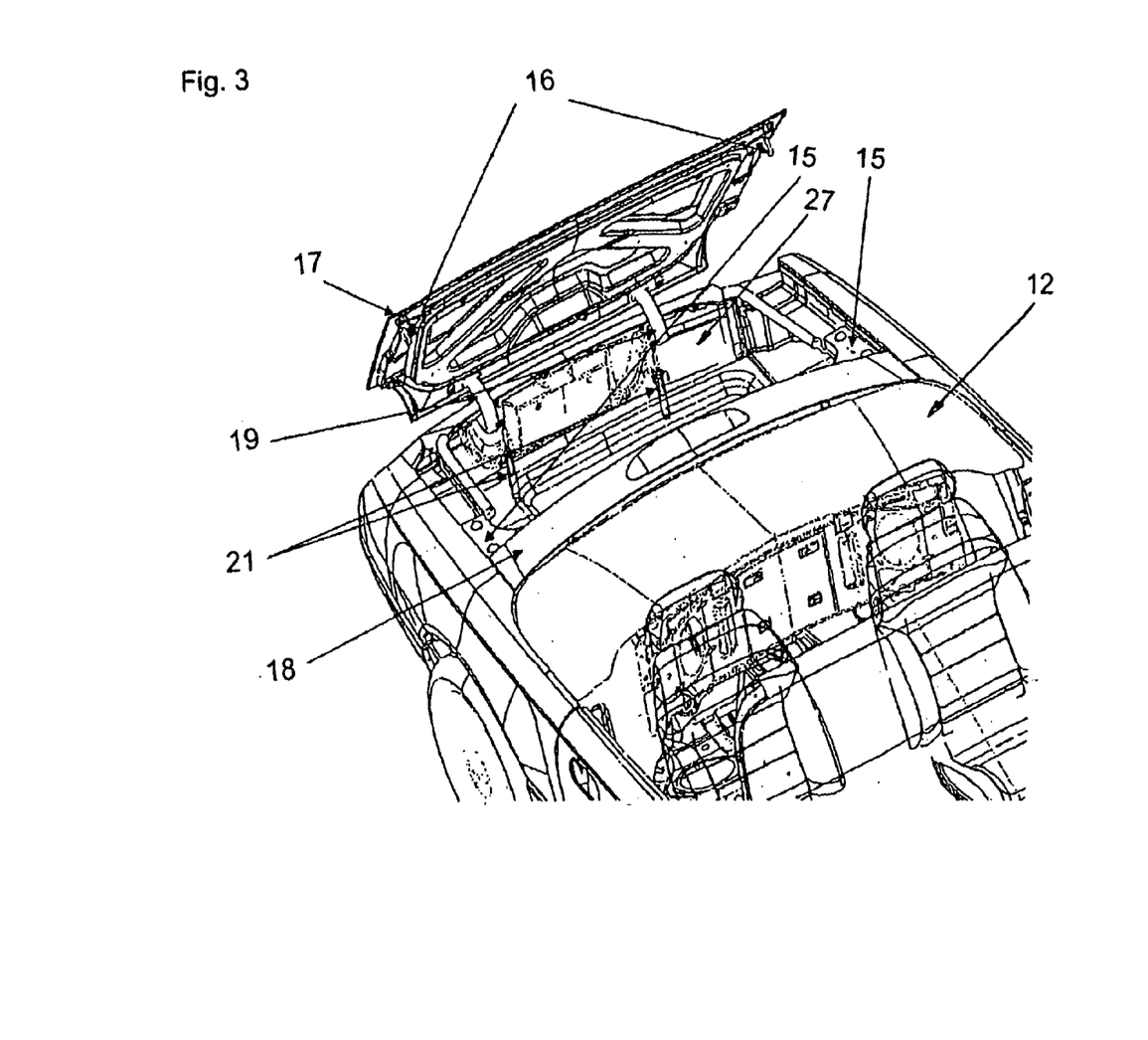
FIG. 3 shows the vehicle with the trunk lid in an opened position.

In FIG. 3, trunk lid 17 is shown in a partially opened position, and trunk 27 is visible below. Hydraulic cylinders 21 actuate a movement of the trunk between an opened and closed positions. Goose neck hinges 19 connect trunk lid 17 to vehicle 10 and guide its movement between the opened and closed positions. Intermediate panel 18 is disposed between the trunk 27 and the convertible top stowage area 23, (not visible in FIG. 3) underneath the stowage cover 12, which is again shown in its covering position, covering the convertible top stowage area 23. Intermediate panel 18 is latched to vehicle 10 in FIG. 3. Latch strikers 16 on trunk lid 17 cooperate with automatic latches 15 of intermediate panel 18, when the trunk lid 17 is in a closed position. Automatic latches 15 can latch the latch strikers 16 when the trunk lid 17 is in the closed position, thus keeping the intermediate panel 18 rigidly attached to the trunk lid 17. Intermediate panel also includes latch strikers 22 on its underside (not visible in FIG. 3) which cooperate with automatic latches on the vehicle body.

Figure 4:
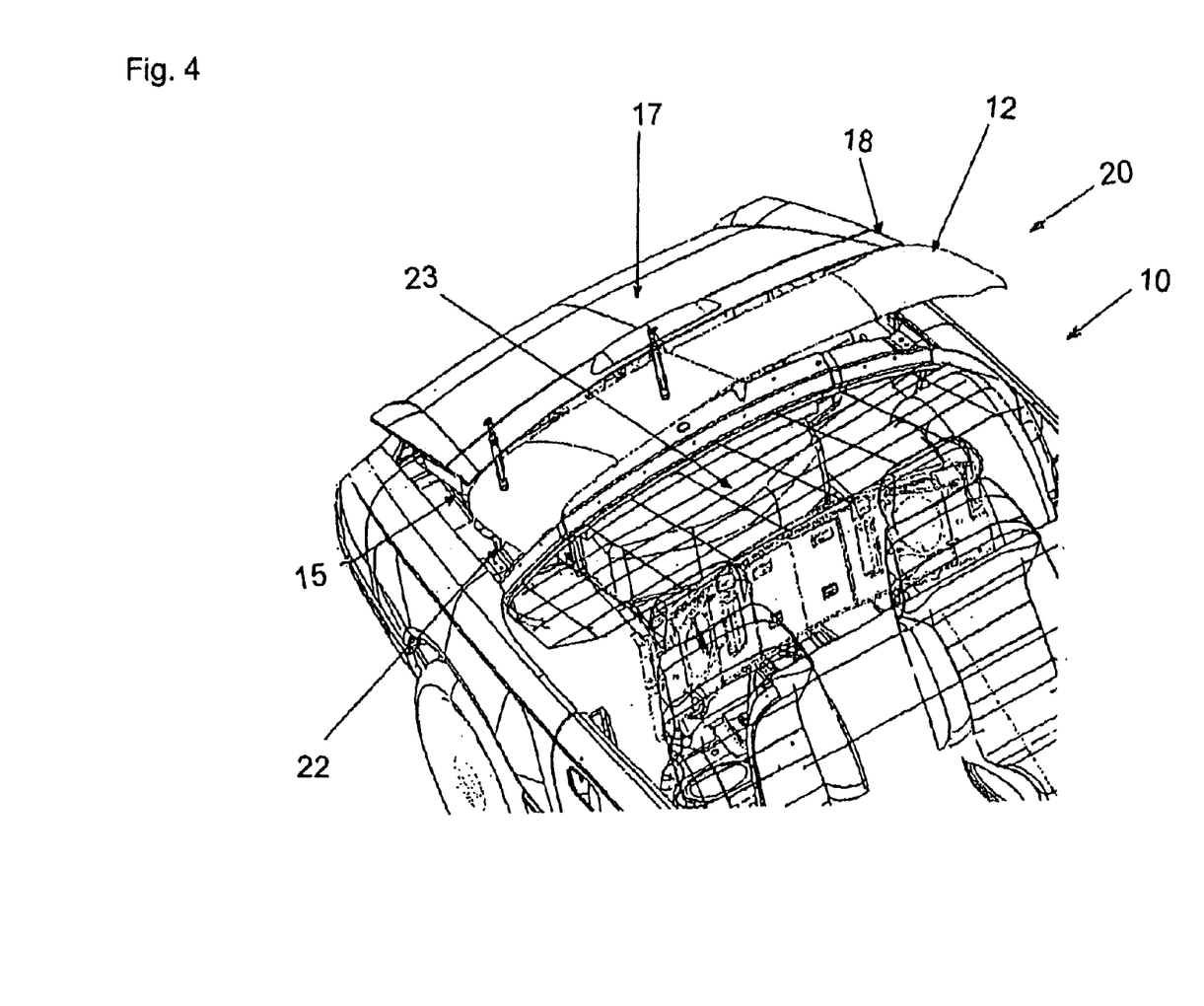
FIG. 4 shows the vehicle with the stowage cover partially lifted from the covering position.

In FIG. 4, the cover assembly 20 is shown with stowage cover 12 in a position between the covering position and the stored position. Convertible top storage area 23 is visible beneath stowage cover 12. Latch striker 22 is visible beneath intermediate panel 18. The automatic latches on the vehicle body (not visible) have been actuated so as to release the latch strikers on the intermediate panel (while the latch strikers 16 on trunk lid 17 are latched to automatic latches 15 on intermediate panel 18). Thus, in FIG. 34, the trunk lid 17 is latched to the intermediate panel 18, and the intermediate panel 18 is unlatched from vehicle 10. Accordingly, when hydraulic cylinders 21 open the trunk lid 17, intermediate panel 18 moves, together with trunk lid 17, away from the vehicle body. Because the stowage cover 12 is connected to intermediate panel 18 by a connecting apparatus (in the form of goose neck hinges 24 shown in FIG. 6), the stowage cover 12 moves together with the intermediate panel 18 and trunk lid 17 away from the convertible top stowage area 23 of vehicle 10.

Figure 5:
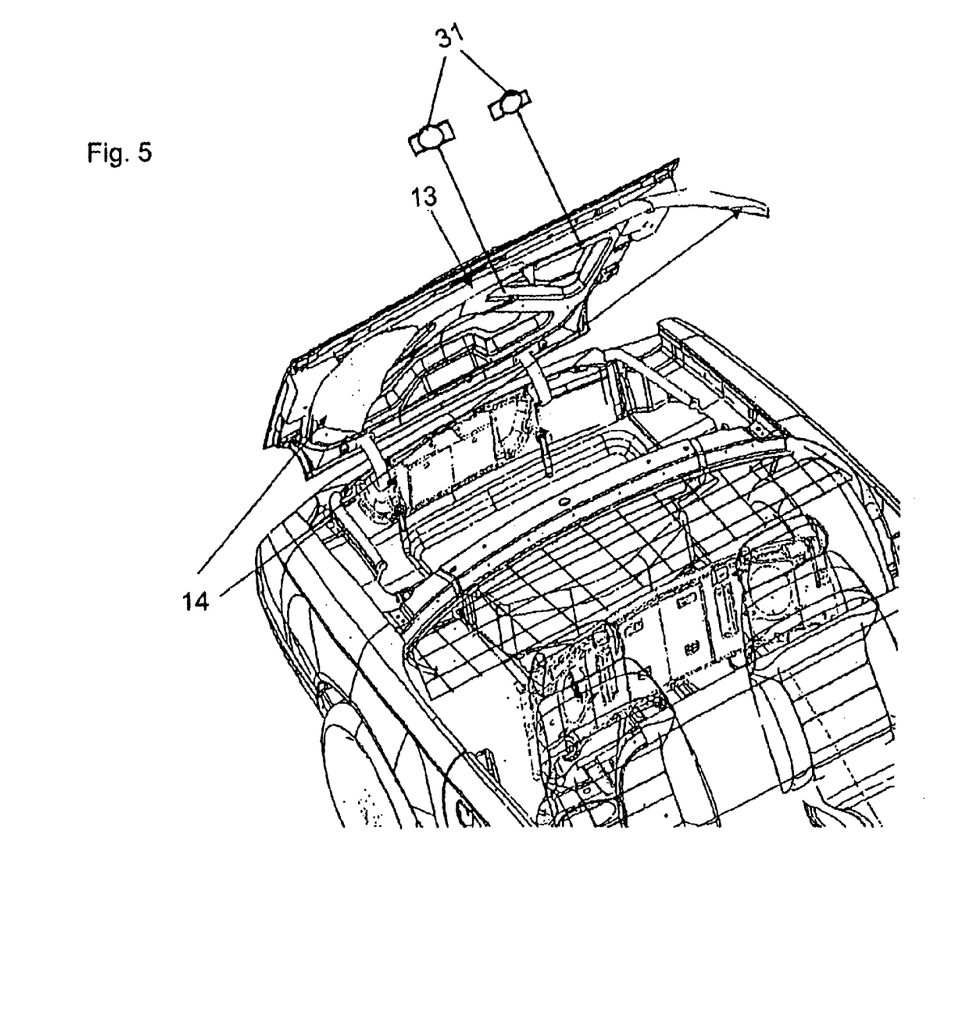
FIG. 5 shows members of the stowage cover hinged to one another.

In FIG. 5, the trunk lid 17 is in a position further approaching the fully opened position. At this position, in the embodiment shown, the side members 14 of the stowage cover 12, which are connected to the middle member 13 by hinges, begin to fold downward relative to the middle member 13. The folding can be accomplished automatically, for example by use of two electric motors 31 mounted to the middle member 13.

Figure 6:
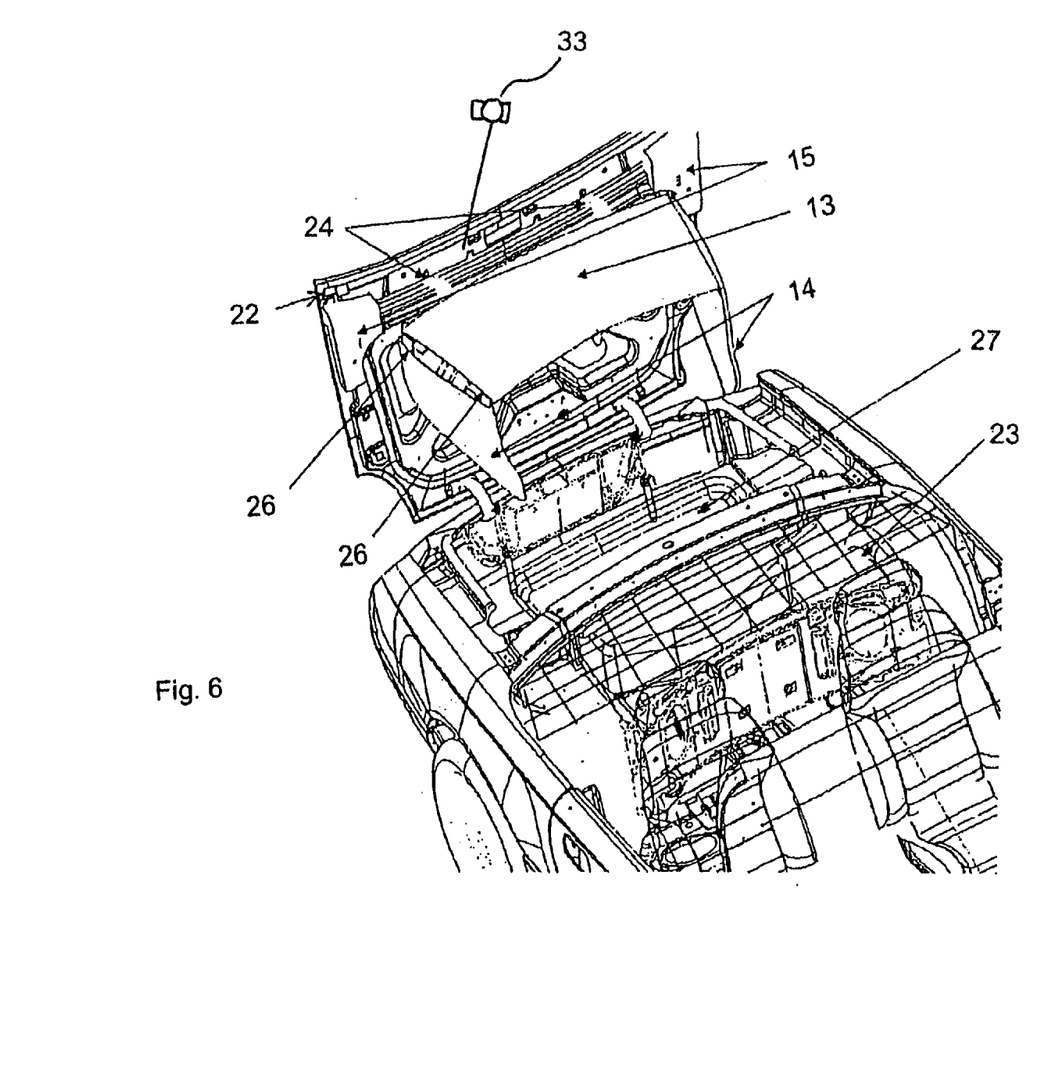
FIG. 6 shows the stowage cover in a partially folded configuration.

In FIG. 6, the trunk lid 17 is in its fully opened position. Side members 14 of stowage cover 12 have rotated about their hinges and the stowage cover 12 is closer to being folded. In addition, connection apparatus (in the form of goose neck hinges 24) have guided the stowage cover 12 in a rotational movement relative to the intermediate panel 18. The rotational movement of the stowage cover relative to the intermediate panel 18 may be accomplished, for example, with the use of an electric motor 33 mounted to the intermediate panel. The underside of the automatic latches 15, which latch the trunk 17 to the intermediate panel 18 are visible in this position, as is latch striker 22 on intermediate panel 18, which may be latched to automatic latches on the body of the vehicle 10 to keep the intermediate panel 18 attached to the vehicle body (for example, when the stowage cover is in its covering position).

Figure 7:
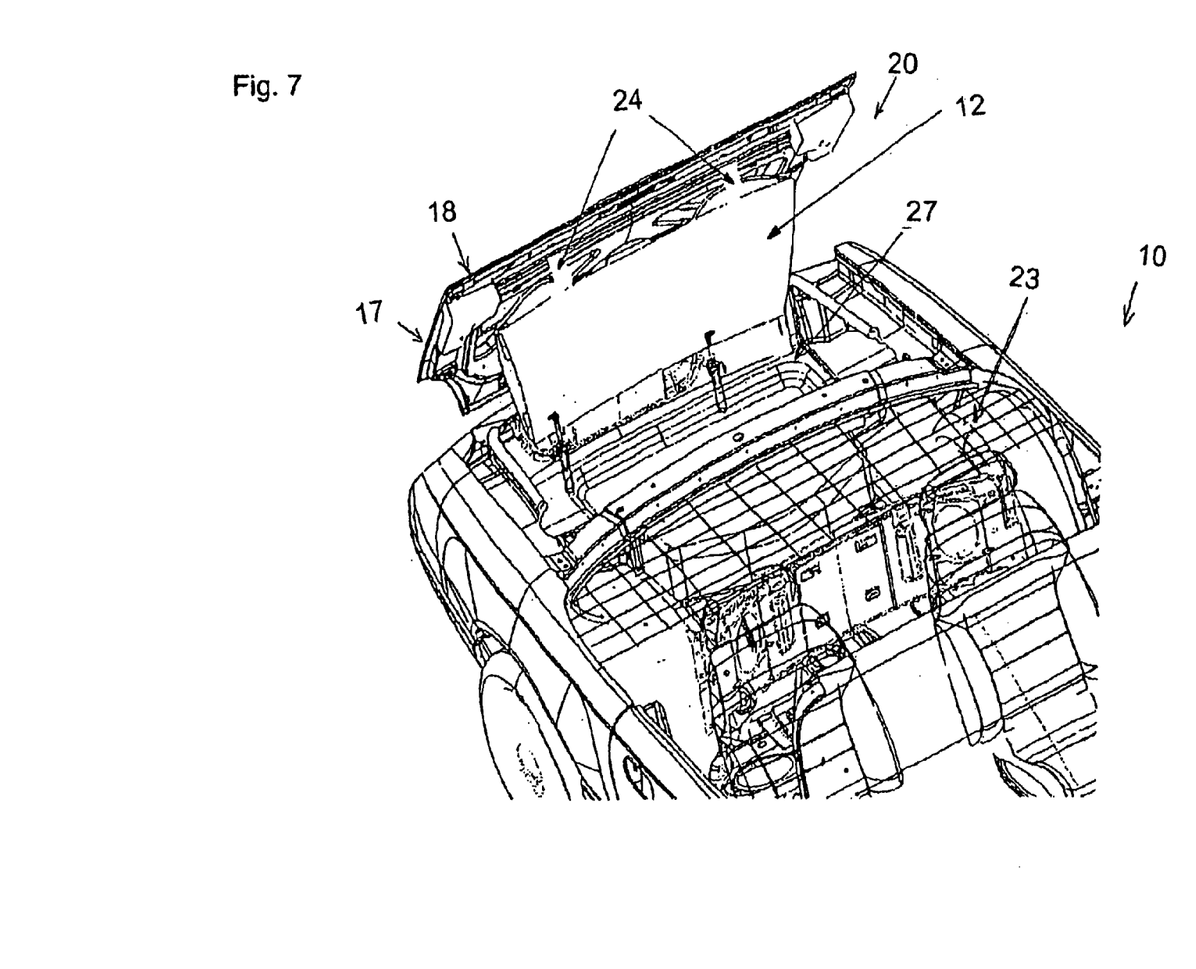
FIG. 7 shows the stowage cover nearly in its stored position.

FIG. 7 shows the stowage cover with the side members 14 fully folded relative to the middle member. In addition, stowage cover has been further guided by goose neck hinges 24 to a position approaching the trunk lid 17.

Figure 8:
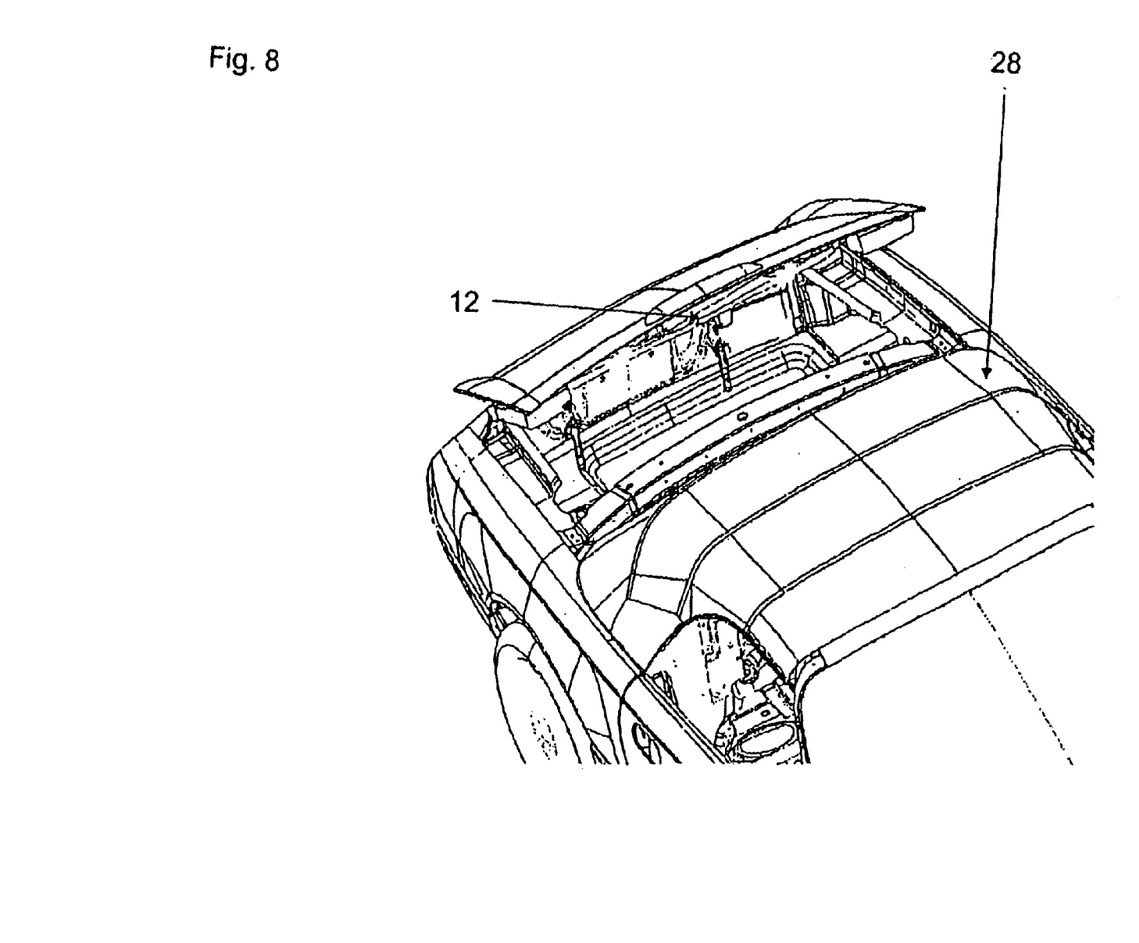
FIG. 8 shows the stowage cover stored and latched under the trunk lid of the vehicle.

In FIG. 8, the stowage cover 17 has moved to its stored position adjacent to the trunk lid and center panel where it is securely latched to into place. The trunk lid 17 and intermediate panel 12 have moved toward a closed position. The convertible top 28 is shown in its full up position. The trunk lid is still functional with the convertible top up. The stowage cover 12, which is folded and securely latched adjacent the trunk lid 17 using latch 32 and intermediate panel 18, takes up a minimum of space, leaving most of the storage space in the trunk available.

It will of course be understood that the present invention has been described above only by way of example and that modifications of details can be made within the scope of the invention.

What is claimed is:

1. A cover assembly for a vehicle having a convertible top stowage area and a trunk, the cover assembly comprising:
   a trunk lid;
   an intermediate panel disposed between the trunk and the convertible top stowage area and supportable by the trunk lid;
   a stowage cover; and
   a connecting apparatus attached to the stowage cover and to the intermediate panel, wherein the stowage cover is moveable, using the connecting apparatus, between a covering position, in which the stowage cover is covering the convertible top stowage area, and a stored position, in which the stowage cover is located in the trunk.

2. The cover assembly as recited in claim 1 further comprising an actuation device for use in moving the stowage cover between the covering position and the stored position.

3. The cover assembly as recited in claim 2, wherein the actuation device includes at least one of a motor, a hydraulic actuator, and a pneumatic actuator.

4. The cover assembly as recited in claim 1 wherein the stowage cover includes at least first and second members, the members substantially coplanar with one another in the covering position and folded in the stored position.

5. The cover assembly as recited in claim 4 wherein the first and second members are pivotally attached to one another.

6. The cover as recited in claim 4 further comprising a folding actuator configured to fold the members when the stowage cover is moved from the covering position to the stored position.

7. The cover assembly as recited in claim 1 wherein the connecting apparatus includes at least one goose neck hinge.

8. The cover assembly as recited in claim 1 wherein the trunk lid is moveable from a closed to an opened position in a rearward direction.

9. The cover assembly as recited in claim 1 further comprising a first latching mechanism for releasably latching the trunk lid to the intermediate panel and a second latching mechanism for releasably latching the intermediate panel to the vehicle.

10. The cover assembly as recited in claim 9, wherein one of the first and second latching mechanisms are configured to unlatch for moving the trunk lid to the open position.

11. The cover assembly as recited in claim 10, wherein the second latching mechanism is configured to unlatch the intermediate panel from the vehicle so as to enable the intermediate panel to move with the trunk lid to the opened position when moving the stowage cover between the covering position and the stored position.

12. The cover assembly as recited in claim 11 further comprising a trunk lid actuation device for moving the trunk lid from the closed position to the opened position.

13. The cover assembly as recited in claim 12 further comprising a controller for controlling the trunk lid actuation device and the first and second latching mechanisms during a movement of the stowage cover between the covering position and the stored position.

14. The cover assembly as recited in claim 13 further comprising a third latching mechanism for latching the stowage cover to the trunk lid when the stowage cover is in the stored position.

15. The cover assembly as recited in claim 1 further comprising a convertible top moveable between an up position to a down position, wherein the convertible top is located in the convertible top stowage area in the down position.

16. The cover assembly as recited in claim 1 further comprising a vehicle hard top mounted to the vehicle when the stowage cover is in the covering position.

17. A method for covering a convertible top of a vehicle, the vehicle including a convertible top stowage area, a trunk, and a trunk lid, the method comprising:

moving the convertible top of the vehicle from an up position to a down position, wherein, in the down position the convertible top is located in the convertible top stowage area; and guiding a stowage cover from a stored position, in which the stowage cover is located in the trunk, to a covering position, in which the stowage cover is covering the stowage area, wherein the guiding is performed using a connection apparatus that is connected to the stowage cover and an intermediate panel, the intermediate panel being supported by the trunk lid and disposed between the trunk and the convertible top stowage area.

18. The method as recited in claim 17 wherein, before the guiding of the stowage cover, the method further comprises:

latching the intermediate panel to the trunk lid;

unlatching the intermediate panel from the vehicle; and opening the trunk lid so that the intermediate panel moves away from the vehicle.

19. The method as recited in claim 17 wherein the opening is performed automatically using at least one of a motor, a hydraulic device, and a pneumatic device.

20. A cover assembly for a vehicle having a convertible top stowage area and a trunk, the cover assembly comprising:

a trunk lid;

an intermediate panel disposed between the trunk and the intermediate panel and having a first side disposed adjacent to the trunk lid and a second side opposite the first side;

a connecting apparatus connected to the intermediate panel; and a stowage cover connected to the connecting apparatus and moveable using the connecting apparatus from the second side of the intermediate panel to the first side of the intermediate panel.

* * * * *